United States Patent

[11] 3,588,580

| [72] | Inventor | Thomas F. Vining<br>Houston, Tex. |
|---|---|---|
| [21] | Appl. No. | 857,015 |
| [22] | Filed | Sept. 11, 1969 |
| [45] | Patented | June 28, 1971 |
| [73] | Assignee | Shell Oil Company<br>New York, N.Y. |

[54] ELECTRODE ASSEMBLY
5 Claims, 3 Drawing Figs.

[52] U.S. Cl. ................................................. 314/130,
13/18, 181/0.5, 340/12
[51] Int. Cl. ..................................................... G01v 1/06,
G10k 10/00
[50] Field of Search........................................... 13/18;
340/12 (ARC); 181/0.5 (EM); 314/60, 130;
219/145, 146

[56] References Cited
UNITED STATES PATENTS

| 1,088,296 | 2/1914 | Richards | 13/8 |
| 2,907,806 | 10/1959 | Rossin, Jr. et al. | 13/18X |
| 3,370,152 | 2/1968 | Rolnick | 219/146 |

*Primary Examiner*—Bernard A. Gilheany
*Assistant Examiner*—Roy N. Envall, Jr.
*Attorneys*—J. H. McCarthy and Theodore E. Bieber ABSTRACT: An electrode assembly for use with spark discharge devices of the type used for marine seismic surveys wherein a plurality of electrodes project from a conductor cable with each electrode being covered with an insulator formed from a series of wafers.

3,588,580

INVENTOR:
T. F. VINING

ELECTRODE ASSEMBLY

BACKGROUND OF THE INVENTION

The present invention relates to an electrode assembly for use with spark discharge devices particularly devices that are used as sound sources when conducting marine seismic surveys. For example, in the copending application of E. C. Burrage entitled "Double-Bubble Spark Array" Ser. No. 837,797, filed June 30, 1969, there is disclosed a spark-type sound source for use in marine seismic explorations. The sound source utilizes a positive and negative electrode to create a pressure bubble at both electrodes and thus doubles the amount of electrical energy that is converted into acoustical energy.

A serious problem arises in all spark-type sound sources in that the electrodes are eroded away as the sound source is used. The electrode erodes away until the insulation surrounding the electrode covers the electrode tip at which time sound source fails.

A partial solution to this problem is the exposure of a greater length of the electrode beyond the end of the insulation. While this increases the useful life of the electrode it in itself is not a complete solution, since the electrode eventually erodes away. The length of the electrode tip that can be left exposed is limited by the electrical parameters of the system since the exposure of too long a tip will cause the spark to be dissipated over a large area and thus reduce the efficiency of the system.

SUMMARY OF THE INVENTION

The present invention solves the above problem by providing a unique construction for an electrode used in a marine seismic exploration system. More particularly, the electrode is provided with an insulating covering formed by pluralities of individual wafers. Thus, as the electrode is consumed or erodes, individual wafers will be blown off to expose a new length of electrode. This process will continue until the complete length of the electrode is consumed.

From the above brief description it is appreciated that the present invention solves the problem of exposing an additional length of electrode as the electrode is consumed without exposing an undue length of the electrode with the resulting reduction in the efficiency of the system. The outer insulation may be formed by various means; for example, a tubular piece of insulation may be provided with a plurality of radial grooves which subdivide the insulation into a series of individual wafers. In addition, the individual grooves may be filled by a plurality of washers to provide a substantially uniform insulation.

BRIEF DESCRIPTION OF THE DRAWINGS

The invention will be more easily understood from the following detailed description of a preferred embodiment when taken in conjunction with the attached drawings in which.

DESCRIPTION OF A PREFERRED EMBODIMENT

Figure 1:
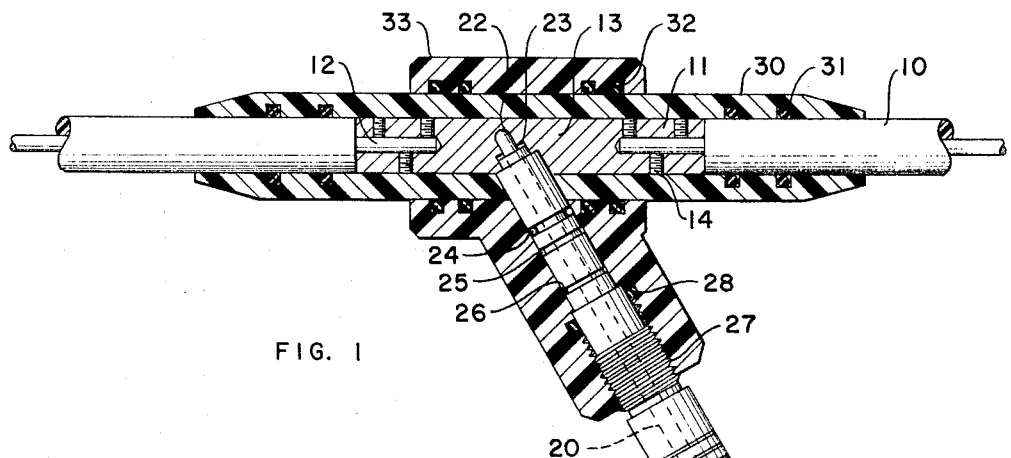
FIG. 1 is an elevation view, partially in section, of a complete electrode assembly constructed according to this invention.

Referring now to the drawings, there is shown an electrode constructed according to this invention and having its outer insulation formed by a plurality of wafers that are blown off as the electrode is consumed. More particularly, there is shown a conductor cable 10 that is formed in separate lengths so that an electrode connector 13 may be spliced therein. More particularly, the ends 11 and 12 of the cable project into suitable holes formed in the end of the connector and are secured therein by a plurality of set screws 14. The splice between the conductor cable and the electrode connector is covered by means of molded insulation 30 that is provided with a plurality of O-rings 31 to insure a fluidtight seal between the outer insulation of the conductor cable and the molded insulation 30. An electrode holder 23 is positioned on the outer surface of the molded insulation 30 and is provided with a plurality of O-rings 32 for insuring a fluidtight seal between the electrode holder and the outer surface of the molded insulation. The electrode holder should also be formed of molded insulation, for example nylon, or a similar plastic material.

The electrode holder is provided with radially extending tubular portion 33 in which the electrode is mounted. The radial portion also extends at an angle to the axis of the conductor cable with the electrode preferably trailing to the rear with respect to the direction in which the sound source is towed. For example, as shown in FIG. 1, the sound source would be towed from the left and thus the electrode trails to the right. The replacable electrode is composed of two parts, a conductor 20 formed from a small diameter rod, and an outer insulator 21. The conductor is preferably formed of a rigid conducting material such as stainless steel while the insulation is formed from a moldable plastic such as nylon.

The upper end of the electrode is provided with a tip portion 22 that projects into an opening formed in the connector 13. The tip portion has an outwardly projecting flange 23 that is forced into contact with the connector to insure electrical contact. The upper end of the electrode insulation is provided with a series of annular grooves 24—26 containing O-rings to provide a watertight seal between the electrode and the electrode holder. The insulation is also provided with a threaded portion 27 which threads into the outer end of the radially extending portion of the holder and forces the flange on the tip portion of the electrode into good electrical contact with the electrode connector. An additional O-ring 28 is provided for insuring a fluidtight seal between the electrode and the electrode holder. The electrode terminates in a tip portion 40 from which the electrical current is discharged.

Figure 2:
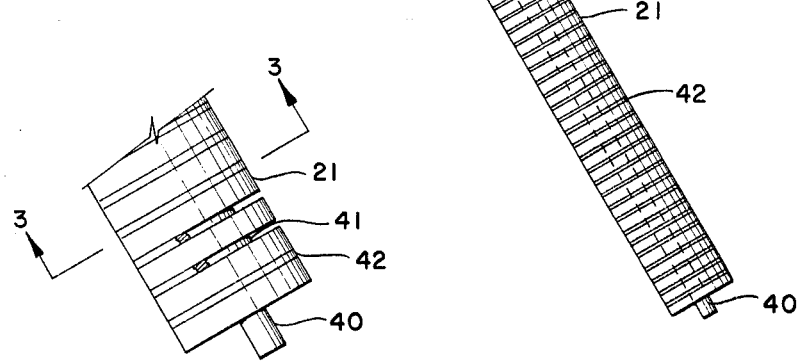
FIG. 2 is an enlarged view showing the details of the insulation.
Figure 3:
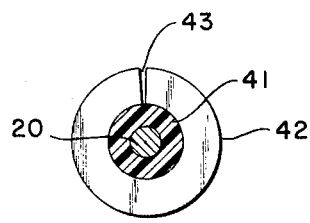
FIG. 3 is a plan view of one of the washers inserted between the individual wafers of the insulation.

Referring now specifically to FIGS. 2 and 3 there is shown the detailed construction of the insulation covering the exposed portion of the electrode that extends beyond the holder. More particularly, the insulation is provided with a plurality of narrow annular grooves 41 that subdivide the portion of the insulation that extends beyond the electrode holder into a series of wafers. While the width and depth of the radial grooves may vary over a wide range, it is preferable that their depth be approximately 12 times their width. The spacing of the grooves can also vary although it is preferable that the spacing between grooves vary between four and eight times the width of the grooves. As shown in FIG. 3, a series of washers 42 formed of the same material as the insulation covering the electrode is provided with radial slots 43 in order that they may be slipped over the insulation and fill the space between the individual wafers of insulation. The washer should have approximately the same thickness as the width of the annular slots and the same overall diameter as the diameter of the insulation.

OPERATION OF PREFERRED EMBODIMENT

The electrode assemblies of the present invention are operated by installing them in the electrodes holders as shown in FIG. 1. Normally a large number of electrodes will be positioned along a single conducting cable to form a directional sound source as described in the above-referenced copending application. After the conductor containing the individual electrodes has been streamed behind a suitable vessel, the electrical current can be discharged from the various electrode tips. As the current is discharged through the tips of the electrodes, it will create a pressure wave or bubble at each tip and produce acoustical energy.

As the use of the electrode array continues, the tip of each electrode will erode away or be consumed until it no longer projects below the end of the insulation. When this condition occurs, the energy from the spark discharge will blow off a wafer of the insulation and expose a new portion of the conductor of the electrode. This will continue until the complete electrode is consumed at which time the electrode must be replaced. The above results are achieved by providing the annular grooves in insulation which in effect reduces the mechanical strength of the insulation and thus permits the spark discharge to blow off the individual wafers of the insulation. The use of the individual wafers insures that only a discrete amount of the insulation will be removed at a time.

The use of washers for filling the annular grooves formed in the insulation provides substantially a constant thickness of insulation throughout the length of the electrode and provides a mechanical cushion for each wafer, this preventing shear failure as a result of the high peak pressure acting on the face of the wafer.

I claim:

1. An electrode array for spark-type sound sources that are suspended in an electrolyte comprising:

a continuous conductor, said conductor having a plurality of connector means for attaching an electrode to said continuous conductor, said connector means being spaced along said conductor;

an electrode housing, said electrode housing being secured to said conductor adjacent said connector means; and a removable electrode assembly, said electrode assembly being removably positioned in said housing to make electrical contact with said conductor, said electrode assembly in addition having a central electrode, at least a portion of said central electrode being covered with an insulating material, said insulating material being formed by a plurality of wafers.

2. The electrode array of claim 1 wherein a plurality of washers having a radial split are positioned around said insulator between said wafers.

3. The electrode array of claim 1 wherein the electrode assembly comprises a central electrode having a portion that makes contacts with said connector means and a second portion that forms the electrode tip, said insulating material having a treaded portion that threads into said housing to secure said electrode assembly to said housing.

4. The electrode array of claim 1 wherein said electrode comprises a solid central conductor; a tubular insulator, said insulator surrounding and in contact with the outer surface of said conductor, said insulator in addition having a plurality of annular grooves formed on its outer surface, said grooves being equally spaced; an insulating washer, said washer having a thickness equal to the width of said grooves and in addition being split to permit installation of the washer in the groove.

5. An electrode for use in spark discharge devices, said electrode comprising:

a solid central electrode;

a tubular insulator, said insulator surrounding said central electrode and being in contact with the outer surface of said electrode, said insulator having a plurality of substantially equally spaced annular grooves formed on its outer surface; and a plurality of washers, said washers having a thickness substantially equal to the width of said grooves, said washers having a radial slit and being installed in the grooves formed in said insulation.